(12) United States Patent
Tormasov et al.

(10) Patent No.: US 11,916,930 B2
(45) Date of Patent: Feb. 27, 2024

(54) NON-INVASIVE VIRUS SCANNING USING REMOTE ACCESS

(71) Applicant: Acronis International GmbH, Schaffhausen (CH)

(72) Inventors: Alexander Tormasov, Moscow (RU); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 26 days.

(21) Appl. No.: 17/304,941

(22) Filed: Jun. 29, 2021

(65) Prior Publication Data

US 2022/0417258 A1 Dec. 29, 2022

(51) Int. Cl.
*H04L 9/40* (2022.01)
*H04L 12/06* (2006.01)

(52) U.S. Cl.
CPC .......... *H04L 63/1416* (2013.01); *H04L 12/06* (2013.01); *H04L 63/20* (2013.01)

(58) Field of Classification Search
CPC ...... H04L 63/1416; H04L 12/06; H04L 63/20
USPC ........................................................ 726/24
See application file for complete search history.

(56) References Cited

U.S. PATENT DOCUMENTS

| | | | |
|---|---|---|---|
| 6,347,375 B1 * | 2/2002 | Reinert | G06F 21/568 726/24 |
| 8,074,276 B1 | 12/2011 | Beloussov et al. | |
| 8,474,039 B2 | 6/2013 | Sallam | |
| 8,584,242 B2 | 11/2013 | Lagar-Cavillva et al. | |
| 9,087,188 B2 | 7/2015 | Sunder et al. | |
| 10,685,119 B2 | 6/2020 | Brandwine et al. | |
| 2004/0210320 A1 * | 10/2004 | Pandya | H04L 67/1097 700/1 |
| 2005/0007324 A1 | 1/2005 | Inada | |
| 2006/0136570 A1 * | 6/2006 | Pandya | G06F 9/30036 709/217 |
| 2009/0008497 A1 | 4/2009 | Bulygin et al. | |
| 2010/0083381 A1 * | 4/2010 | Khosravi | G06F 21/567 726/24 |

(Continued)

FOREIGN PATENT DOCUMENTS

WO WO 2019/160427 8/2019

OTHER PUBLICATIONS https://developer.nvidia.com/blog/detecting-out-of-band-malware-with-bluefield-dpu/, Jan. 14, 2021.

*Primary Examiner* — Teshome Hailu
(74) *Attorney, Agent, or Firm* — ESPE Legal Consultancy FZ-LLC (57) ABSTRACT

A system and method are disclosed for performing non-invasive scan of a target device. The system is configured for: i) loading an endpoint protection agent to a target device; ii) providing a remote direct memory access of the target device to the remote security server for reading a memory of the target device; iii) scanning, by a second memory scan engine of the remote security server, the memory of the target device upon the violation of the security policy; iv) identifying, by the second memory scan engine of the remote security server, a threat on the target device; and v) sending, by the remote security server, a security response action to the endpoint protection agent on the target device in accordance with the security policy.

15 Claims, 4 Drawing Sheets

(56) References Cited

U.S. PATENT DOCUMENTS

| | | | | |
|---|---|---|---|---|
| 2011/0107423 A1* | 5/2011 | Kolar Sunder | ....... | G06F 21/567 713/176 |
| 2011/0197279 A1* | 8/2011 | Ueoka | ................... | G06F 21/568 726/24 |
| 2012/0084862 A1* | 4/2012 | Freeman | ................ | G06F 21/56 726/23 |
| 2013/0232576 A1* | 9/2013 | Karnikis | ................ | G06F 21/56 726/24 |
| 2014/0013434 A1* | 1/2014 | Ranum | ................ | G06F 21/564 726/24 |
| 2015/0227742 A1* | 8/2015 | Pereira | ................... | G06F 21/56 726/24 |
| 2021/0144174 A1* | 5/2021 | N | ....................... | H04L 63/1433 |

\* cited by examiner

NON-INVASIVE VIRUS SCANNING USING REMOTE ACCESS

FIELD OF THE INVENTION

The present disclosure generally relates to data security management, and particularly, but not limitedly, to a system and method for performing a non-invasive malware scan of a target device.

BACKGROUND

With stupendous advancements in digital technology, data security has become a key concern. Constantly updating malware forms is a pervasive problem that results in successful malware attacks, changing threat definitions, compromising critical data, and so on. Data security is normally defended using various malware detection units; usually classified as malware detection programmable components and security components. Data analysis can be performed by the malware detection programmable component at various levels of the computing system, such as user space, kernel space, and emulator. The analysis can be performed on individual processes, specific applications, system functions, and the entire operating system. Files, threads, and registry operations are supported as types of analysis. If the malware attack is detected, the security components can perform corrective actions to block any communication with the malware.

Conventionally, to monitor the state of any computing system, data may be collected from three main sources, i.e., disk, memory, and network. Most conventional malware detection units utilize the disk or network approach for detecting the presence of a malware or any other threat to a computing system. A disadvantageous aspect of such an approach is that it is insufficient to overcome the hurdles presented by modern malware. Modern malware is constantly evolving, and many features of the evolving malware are related to bypassing the barriers of the conventional malware detection units. For example, some recent malware has been designed to attack a computing system without giving rise to any footprints on the disk. As such, the malware detection units that employ the collection of required data from the disk may not necessarily detect the attack from such a malware.

Another example is malware that uses a network or the internet to operate. Such malware may be detected by a detection unit using network data for malware detection. However, a disadvantageous aspect of such malware detection units is that while the network traffic may contain considerable indications of compromise, the sheer volume of the network traffic may be too large, stateless, random, and complex. Thus, even if an indicator of compromise is detected, it may not be possible to perform an analysis of malware behavior. To thoroughly grasp the malware behavior and draw sensible conclusions from the network traffic, a detailed analysis in a run-time environment may be required.

An advantageous aspect of run-time data is that it may provide better readability of system events and actions. Hence, runtime data allows for a better understanding of malware behavior and detection software can more accurately identify malicious activity. Access to run-time data is provided via the physical memory of the computing system under consideration. Any changes brought about by the influence of malware may be detectable as changes in the memory state. However, scanning memory from inside the operating system of the device may still have a disadvantageous aspect, in that the malware may be configured to use self-protection and stealth approaches to avoid detection from the anti-malware program installed on the operating system. It is to these ends that the present invention has been developed. The present invention is a non-invasive remote malware scanning method and system that does not load on a network or operating system and efficiently detects all threats.

SUMMARY

Embodiments and technical aspects disclosed herein relate to a system and method for performing a non-invasive malware scan of a target device.

The present subject matter envisages a method for performing a non-invasive malware scan of a target device. The method comprises loading an endpoint protection agent to a target device on at least one computing system level of the target device, for monitoring, via a first memory scan engine of the endpoint protection agent, the target device for a violation of a security policy on the endpoint protection agent; providing a remote direct memory access of the target device to the remote security server for reading a memory of the target device; scanning, by a second memory scan engine of the remote security server, the memory of the target device upon the violation of the security policy; identifying, by the second memory scan engine of the remote security server, a threat on the target device; and sending, by the remote security server, a security response action to the endpoint protection agent on the target device in accordance with the security policy.

In accordance with a non-limiting exemplary embodiment of the present subject matter, the at least one computing system level includes application level and kernel level.

In accordance with a non-limiting exemplary embodiment of the present subject matter, the method further comprises performing, by a first task manager of the endpoint protection agent, the security response action on the target device.

In accordance with a non-limiting exemplary embodiment of the present subject matter, the method further comprises updating and defining rules and definitions of the security policy.

In accordance with a non-limiting exemplary embodiment of the present subject matter, the security response action includes at least one of a process termination, block of network connection, file deletion, and system restore.

In accordance with a non-limiting exemplary embodiment of the present subject matter, the violation of security policy indicates at least one of a presence of a suspicious system activity, a presence of an untrusted process, an unsecure connection, and a suspicious user behaviour.

In accordance with a non-limiting exemplary embodiment of the present subject matter, the remote security server is configured to scan only memory space related to the violation of the security policy.

The present subject matter envisages an alternative embodiment of a method for performing a non-invasive malware scan of a target device. The method comprises loading an endpoint protection agent to a target device on at least one computing system level of the target device, for monitoring, via a first memory scan engine of the endpoint protection agent, the target device for a violation of a security policy on the endpoint protection agent; providing a Remote Direct Memory Access (RDMA) of the target device to the remote security server for reading a memory of the target device; buffering data at a buffer of the endpoint protection agent, for remote scanning in accordance with the security policy; reading buffered data from the endpoint protection agent using the RDMA on the remote security server; performing a memory scan of the buffered data, by a second memory scan engine of the remote security server; and sending, by the remote security server, a security response action to the endpoint protection agent on the target device in accordance with the security policy.

The present subject matter also envisages a system for performing a non-invasive malware scan on a target device. The system comprises an endpoint protection agent configured for operation on the target device. The endpoint protection agent comprises a first memory scan engine configured for monitoring the target device for violation of a security policy; a communication unit coupled to the first memory scan engine; and a first task manager configured for performing a security response action on the target device in accordance with the security policy. The system further comprises a remote security server communicatively coupled to the endpoint protection agent. The remote security server comprises a threat database; and a second memory scan engine configured for scanning a memory of the target device upon the violation of the security policy; identifying a threat; and recommending the security response action to the first task manager in accordance with the security policy. In one embodiment, the target device includes a first Remote Direct Memory Access (RDMA) unit, and the remote security server includes a second RDMA unit for facilitating provision of remote direct memory access of the target device to the remote security server to perform the non-invasive malware scan of the target device.

In accordance with a non-limiting exemplary embodiment of the present subject matter, the remote security server further comprises a second task manager configured for scheduling system associated operations and scan queues; and a security policy manager configured to update and define rules and definitions of the security policy.

In accordance with a non-limiting exemplary embodiment of the present subject matter, the security response action includes at least one of a process termination, block of network connection, file deletion, and system restore.

In accordance with a non-limiting exemplary embodiment of the present subject matter, the violation of security policy indicates at least one of a presence of a suspicious system activity, a presence of an untrusted process, an unsecure connection, and a suspicious user behaviour.

In accordance with a non-limiting exemplary embodiment of the present subject matter, the remote security server is configured to scan only memory space related to the violation of the security policy.

In accordance with a non-limiting exemplary embodiment of the present subject matter, the endpoint protection agent further comprises a buffer for buffering data of the target device.

In accordance with a non-limiting exemplary embodiment of the present subject matter, the remote security server is configured to scan buffering data.

BRIEF DESCRIPTION OF DRAWINGS

A better understanding of embodiments of the present disclosure (including alternatives and/or variations thereof) may be obtained with reference to the detailed description of the embodiments along with the following drawings, in which.

DETAILED DESCRIPTION

In general, this disclosure describes systems and methods for performing non-invasive memory scans of a target device. An advantageous aspect of the systems and methods, as envisaged in the present subject matter, is the usage of a Remote Direct Memory Access (RDMA) protocol for providing remote memory access of a target device to a remote security server. More specifically, the advantage of using the RDMA protocol is that RDMA has a complex over-network transfer mechanism and detection of suspicious behaviour patterns may be performed using the RDMA parameters on a system connected to another system even without running a virus scanner on the connected systems. An advantageous aspect of such a feature is that it directly boosts the computing capacity and computing speed of the system on which the scan is being performed. System resources are minimally utilised in performing such a scan, which would have been otherwise utilised by a conventional on-board virus scanner.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

Malware threats can be found in various types, such as virus, worm, spam, phishing exploration, spyware, adware, or the like. The threat, no matter how it is categorized, may need to be stopped at various points of a networked computing systems, including at least one or more laptops, desktops, servers, gateways, communication ports, handheld or mobile devices, firewalls, and the like. To this end, the present disclosure envisages a system for performing non-invasive malware scans of one or more target devices.

Figure 1:
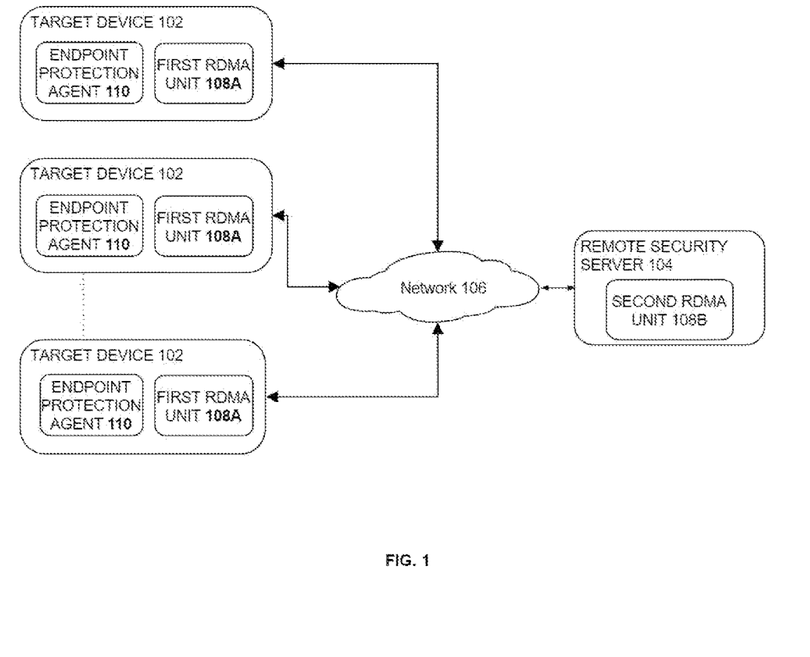
FIG. 1 illustrates an exemplary environment for implementing a non-invasive scan on one or more target devices, in accordance with the present subject matter.

FIG. 1 illustrates an exemplary environment 100 for implementing a non-invasive scan on one or more target devices 102, in accordance with the present subject matter. Referring to FIG. 1, a remote security server 104 is communicatively coupled to a plurality of target devices 102 via a network 106. The target devices 102 include a first RDMA unit 108A, and the remote security server 104 includes a second RDMA unit 108B. The first RDMA unit 108A and the second RDMA unit 108B facilitate the provision of Remote Direct Memory Access (RDMA) of the target devices 102 to the remote security server 104.

Examples of the network 106 include, without limitation, in accordance with the present embodiment, a Wide Area Network (WAN), the Internet, a mobile telephone network (e.g., CDMA, GSM, NDAC, TDMA, E-TDMA, NAMPS, WCDMA, CDMA-2000, UMTS, 3G, 4G, 5G), (e.g., PON), a public network, a private network, and/or other wired or wireless communications network configured to carry data. Computing devices and networks also may support wireless wide area network (WWAN) communications services including Internet access.

The target devices 102 may be a computing device having a processor, such as laptops, desktops, servers, gateways, communication ports, handheld or mobile devices implemented in personal or entity capacity, such as corporate, commercial, educational, governmental, or the like. The network may be distributed amongst a plurality of computing devices and a plurality of geographical locations. The malware threat may come from a plurality of sources, such as from network threats, physical proximity threats, secondary location threats, and the like. The target device 102 may pick up the threat when interfacing with an unprotected server through the Internet.

As mentioned previously in the present disclosure, the advantage of using the RDMA protocol facilitated by the first RDMA unit 108A and the second RDMA unit 108B, is that RDMA has complex over-network transfer mechanism, and using the RDMA parameters, detection of suspicious behaviour patterns, for a target device 102 connected to the remote security server 104 even without running of virus scanner on the target device 102, may be performed. An advantageous aspect of such a feature is that the target device 102 is getting scanned for detection of malware with minimal utilization of processing power of the target device 102, as the scan is being performed by the remote security server 104 that has remote direct memory access of the target device 102. Therefore, the processing power of the target device 102 may be effectively used for multiple other tasks using the system and method envisaged in the present disclosure, as against the conventional malware detection systems wherein the consumption of processing resources by typical virus scanners generally slows down the device considerably.

The target device 102 comprises an endpoint protection agent 110 that is configured for operation on the target device 102. The endpoint protection agent 110 is configured to monitor a memory of the target device 102 for violation of a security policy and perform a security response action on the target device 102 on detection of the violation of the security policy. More specifically, the instance of violation of security policy on the target device 102 triggers the remote security server 104 to perform the memory scan of the target device 102. In one embodiment, the memory scan may be a full memory scan. In another embodiment, the memory scan may be a partial memory scan of only the infected portion of the memory of target device 102. In accordance with one implementation, the infected portion herein means the infected or related processes that are occurring in the device during the scanned instance. More specifically, on observing that the security policy violation has taken place, a scan is performed to detect factors like applications running from an untrusted source or opening of an encrypted document. In another implementation, the scan may detect of one or more indicators of compromise from the registry code of operating system service. In such a scenario, the device memory related to processes associated with the suspicious object, which may include browser or document viewer, control system service or any user behaviour, will be scanned.

Figure 2:
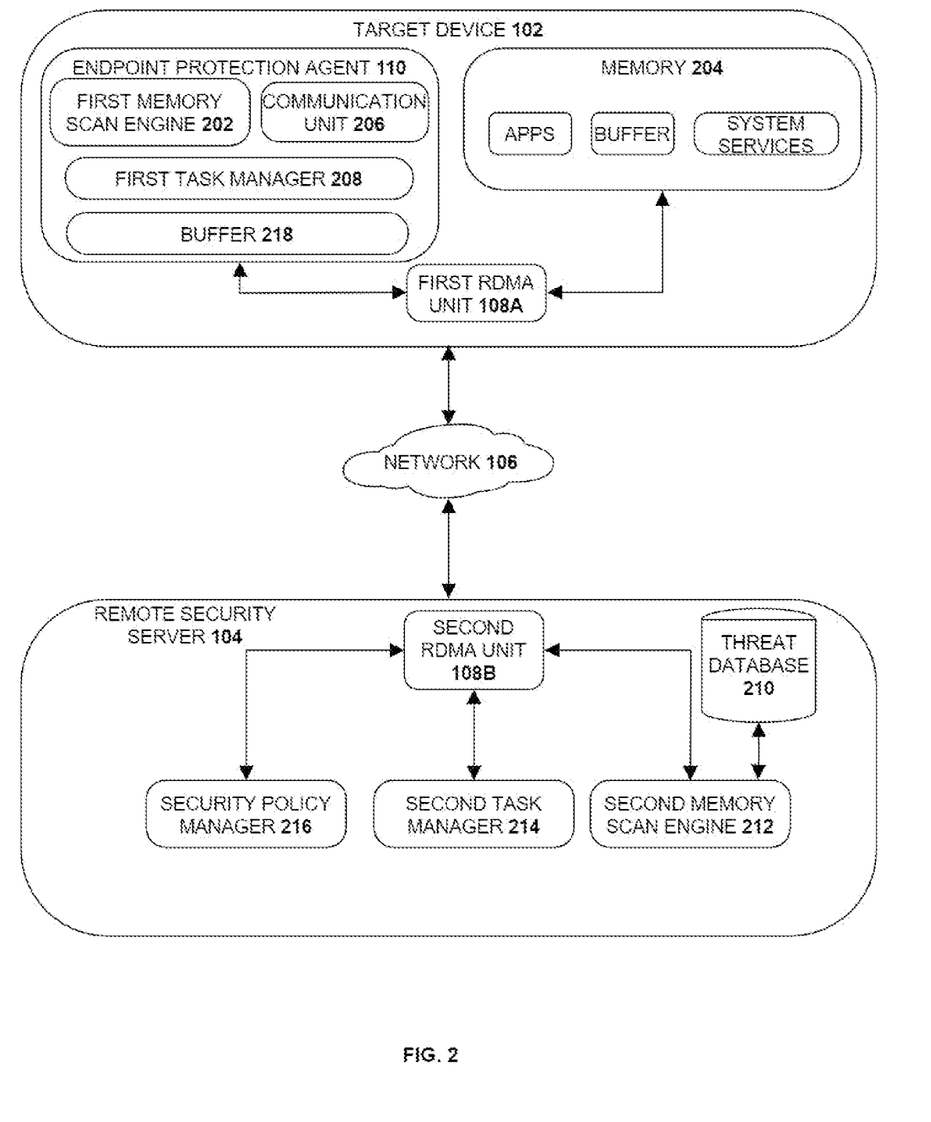
FIG. 2 illustrates a function block diagram of a system for performing a non-invasive scan a target device, according to the embodiment of the present disclosure.

The interaction of the target device 102 with the remote security server 104 is described in more detail hereinafter with reference to FIG. 2, wherein FIG. 2 illustrates a function block diagram of a system 200 for performing a non-invasive scan a target device 102, according to the embodiment of the present disclosure. The system comprises the endpoint protection agent 110 configured for operation on the target device 102. The endpoint protection agent 110 comprises a first memory scan engine 202 configured for monitoring a memory 204 of the target device 102 for violation of a security policy. In accordance with a non-limiting exemplary embodiment of the present subject matter, the violation of security policy indicates at least one of a presence of a suspicious system activity, a presence of an untrusted process, an unsecure connection, and a suspicious user behaviour. In another implementation, the first memory scan engine may be configured to scan not only the memory 204, but also for any operating system object scanning engines, including but not limited to, file scanning, web-scanning, application control, and the like.

The endpoint protection agent 110 further comprises a communication unit 206 coupled to the first memory scan engine 202 and a first task manager 208 configured for performing a security response action on the target device 102 in accordance with the security policy. The communication unit 206 may be any communication protocol that may be deployed in facilitating communication between the endpoint protection agent 110 and the first RDMA unit 108A.

The endpoint protection agent 110, in accordance with an embodiment of the present subject matter, may either be a hardware component or a software component. The endpoint protection agent 110, may be installed on the target device 102, via an external memory device or may be downloaded on the target device 102 from the internet, according to some implementations. In yet another implementation, the endpoint protection agent 110 works in a space isolated from other applications and processes, like a container or a virtual machine or a module on a hypervisor. In yet another embodiment, the endpoint protection agent may be a part of RDMA implementation protocol deployed by the system 200.

The system 200 further comprises the remote security server 104 communicatively coupled to the endpoint protection agent 110 via the network 106, in accordance with one embodiment. The remote security server 104 comprises a threat database 210. The threat database 210 may be a database that may be configured to regular updates for countering the newest malwares. The remote security server 104 may be configured to regularly monitor one or more external malware databases for new malware definitions. The new malware definitions are processed for inclusion in the threat database 210, and in this manner the threat database 210 may be kept updated include the latest malware definitions, thereby allowing their detection on the devices being monitored (target devices).

The remote security server 104 further comprises a second memory scan engine 212 configured for scanning the memory 204 of the target device 102 upon the violation of the security policy, wherein such violation of the security policy is detected by the endpoint protection agent 110. The second memory scan engine 212 is also configured for identifying a threat subsequent to the scanning of the memory 204. More specifically, the attributes of the threat may be matched against the threat attributes stored and present in the threat database 210. Once the threat is identified, the second memory scan engine 212 is configured to recommend the security response action to the first task manager 208 in accordance with the security policy. More specifically, the security response action is an action that is performed by the first task manager 208 to overcome or to remedy the detected threat. In accordance with a non-limiting exemplary embodiment of the present subject matter, the security response action includes at least one of a process termination, block of network connection, file deletion, and system restore.

In one embodiment, the remote security server 104 further comprises a second task manager 214 configured for scheduling system associated operations and scan queues. The second task manager 214, in accordance with one embodiment, may be configured to search for updates for the threat database, system program updates, and the like. Furthermore, the second task manager 214 may be configured to generate scan queues depending upon the number of security policy violations detected by the endpoint protection agent 110. More specifically, many security policy violations may take place at the same time over a number of target devices. Therefore, queuing of scans may be required in such a case, and the same is facilitated by the second task manager 214. The remote security server 104 may then keep scanning for malware one or more target devices in accordance with scan queues generated by the second task manager 214. Furthermore, the scan queues may include instances of complete memory scan and partial memory scans, depending on the remedial requirements for overcoming different types of violations of the security policy. Partial memory scan herein means the scanning of only that portion of the memory 204 of the target device 102 that has been infected by the malware.

The remote security server may further include a security policy manager 216. The security policy manager 216 is configured to update and define rules and definitions of the security policy. New rules and definitions may need to be added to the security policy of the system 200 based on the evolution of malware. As new malwares are released over the internet, they are classified as threats in the threat database 210, and at times the security policy may need to be updated in accordance with the attributes of the newly released malware.

In one embodiment, the target device 102 includes the first Remote Direct Memory Access (RDMA) unit 108A, and the remote security server 104 includes a second RDMA unit 108B for facilitating provision of remote direct memory access of the target device 102 to the remote security server 104 to perform the non-invasive malware scan of the target device 102. The advantages of the use of RDMA protocol have already been discussed in the previous sections of the present disclosure. The same are not repeated herein for the sake of brevity of the present disclosure.

In one embodiment, the endpoint protection agent further comprises a buffer 218 for buffering data of the target device 102 that is to be sent to the remote security server 104 for further scanning via the second memory scan engine 212. The scanning of the memory 204 of the target device 102 by the remote security server 104 is initiated if any indications of compromise are detected in the buffered data. In one implementation, the buffered data may include the memory data for scanning by the remote security server 104, wherein the remote security server 104 will not scan any other memory blocks apart from the buffered data. The buffered data can include files, memory blocks of applications running on the target device, system registry, meta-data of system objects of a target device and other relevant data, that is valuable for controlling security policy.

The system 200, in accordance with some exemplary implementations of the present subject matter, may be configured for usage on an enterprise network, wherein the enterprise network may have a system admin device. The system admin device may have a plurality of end devices communicatively coupled thereto. The system admin device, in accordance with the instant implementation, may be configured to have direct memory access to the memory of the end devices. In accordance with instant implementation, the system admin device may be the target device 102 that is communicatively coupled to the remote security server 104 via the remote direct memory access protocol. The target device (system admin device) 102 may include at least one endpoint protection agent 110 that may be configured for pre-scanning memory of the target device (system admin device) 102 as well as the memory of end devices communicatively coupled to the target device (system admin device) 102. In case of detection of security policy violation via the endpoint protection agent 110, a security response action may be generated at the remote security server 104 and sent to the target device (system admin device) 102 for execution by the endpoint protection agent 110 either on the memory of the target device (system admin device) 102 or on the memory of the end devices communicatively coupled to the target device (system admin device) 102. An advantageous aspect of such an implementation is that the remote security server 104 can effectively scan a multiplicity of end devices via the target device (system admin device) 102, wherein the computing resources of the end devices are minimally utilised since the malware scan is performed remotely via the remote security server 104.

Figure 3:
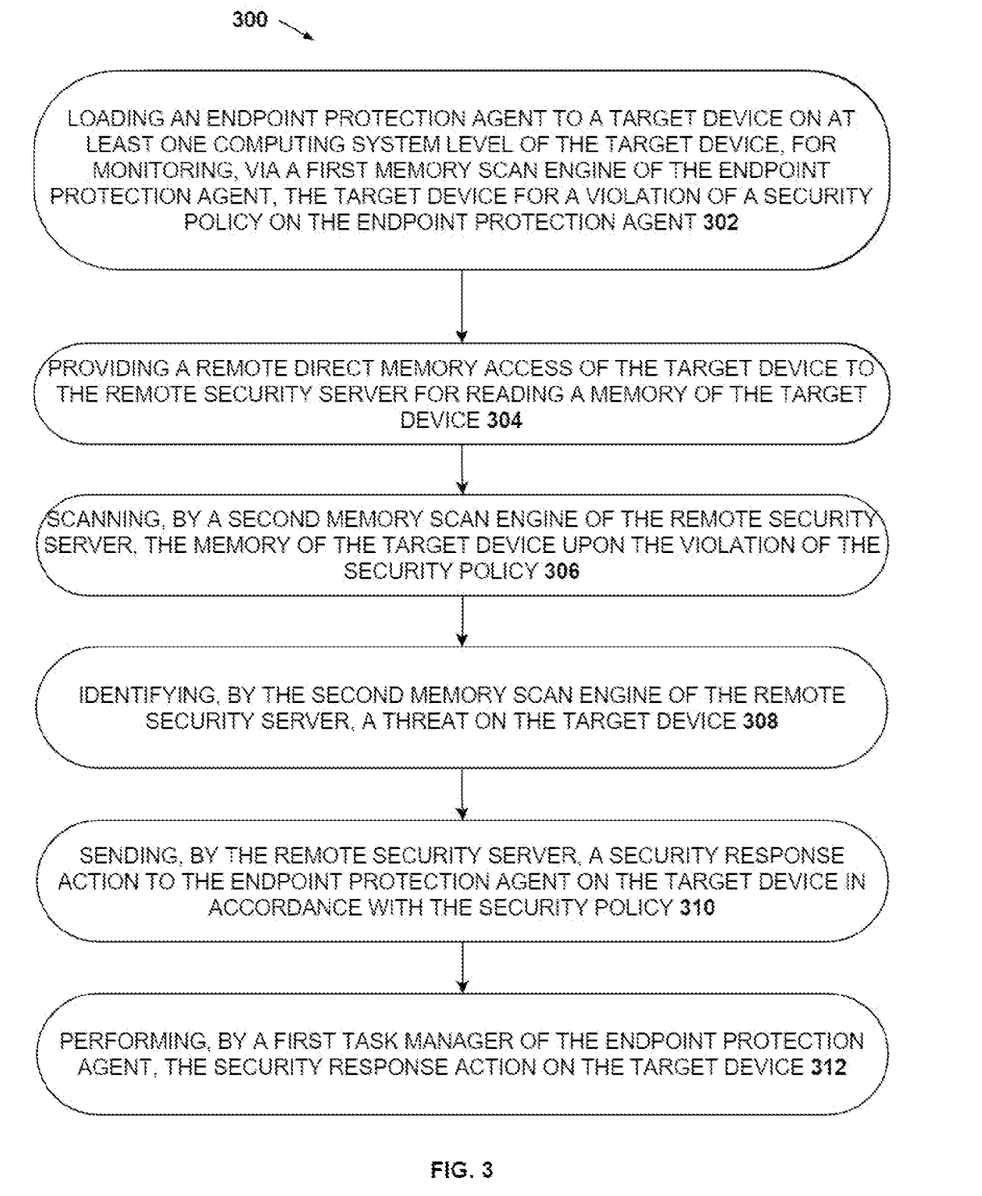
FIG. 3 illustrates a method diagram for performing a non-invasive scan a target device, according to the embodiment of the present disclosure, according to the embodiment of the present disclosure.

FIG. 3 depicts method steps being executed by the system 200 for performing a non-invasive malware scan of the target device 102. The method 300 is implemented using the target device 102 and the remote security server 104. The method is particularly implemented to perform a malware scan on the memory 204 of the target device 102 via the remote security server 104 using the RDMA protocol. The order in which the method 300 is described is not intended to be construed as a limitation, and any number of the described method blocks can be combined in any order to implement the method or any alternative methods. Additionally, individual blocks may be deleted from the method without departing from the spirit and scope of the subject matter described herein. Furthermore, the method can be implemented in any suitable hardware, software, firmware, or combination thereof.

At block 302, the method 300 comprises loading an endpoint protection agent 110 to a target device 102 on at least one computing system level of the target device. In accordance with a non-limiting exemplary embodiment of the present subject matter, the at least one computing system level includes application level and kernel level. The loading of the endpoint protection agent 110 on the target device 102 is performed for monitoring, via a first memory scan engine 202 of the endpoint protection agent 110, the target device 102 for a violation of a security policy on the endpoint protection agent 110.

At block 304, the method 300 comprises providing a remote direct memory access of the target device 102 to the remote security server 104 for reading a memory 204 of the target device 102. In one embodiment, the target device 102 includes a first Remote Direct Memory Access (RDMA) unit 108A, and the remote security server 104 includes a second RDMA unit 108B for facilitating provision of remote direct memory access of the target device 102 to the remote security server 104 to perform the non-invasive malware scan of the target device 102.

At block 306, the method 300 comprises scanning, by a second memory scan engine 212 of the remote security server 104, the memory 204 of the target device 102 upon the violation of the security policy. More specifically, the endpoint protection agent 110 monitors or pre-scans the target device 102 for detecting any violations to the security policy on the target device 102. It is to be noted that this pre-scan is not a complete scan on the target device 102, and it is just a pre-scan monitoring to detect violations of the security policy. In accordance with a non-limiting exemplary embodiment of the present subject matter, the violation of security policy indicates at least one of a presence of a suspicious system activity, a presence of an untrusted process, an unsecure connection, and a suspicious user behaviour. Detection of violation of security policy by the endpoint protection agent 110 triggers the malware scan of the memory 204 of the target device 102 via the remote security server 104 via the RDMA protocol.

At block 308, the method 300 comprises identifying, by the second memory scan engine 212 of the remote security server 104, a threat on the target device 102. More specifically, the remote security server 104 includes a threat database 210, and the second memory scan engine 212 is configured to map the attributes of the detected threat with those present in the threat database 210 for identifying the type of threat that has affected the memory 204. In accordance with a non-limiting exemplary embodiment of the present subject matter, the remote security server is configured to scan only memory space related to the violation of the security policy.

At block 310, sending, by the remote security server 104, a security response action to the endpoint protection agent 110 on the target device 102 in accordance with the security policy. After the threat has been identified, an appropriate security response action corresponding to the kind of threat is generated and sent to the endpoint protection agent 110.

At block 312, the method 300 further comprises performing, by a first task manager 208 of the endpoint protection agent 110, the security response action on the target device 102. In accordance with a non-limiting exemplary embodiment of the present subject matter, the security response action includes at least one of a process termination, blocking the network connection, file deletion, and system restore.

In accordance with a non-limiting exemplary embodiment of the present subject matter, the method 300 further comprises updating and defining rules and definitions of the security policy. In one embodiment, the step of updating and defining rules and definitions of the security policy is performed by the security policy manager 216 of the remote security server 104.

Figure 4:
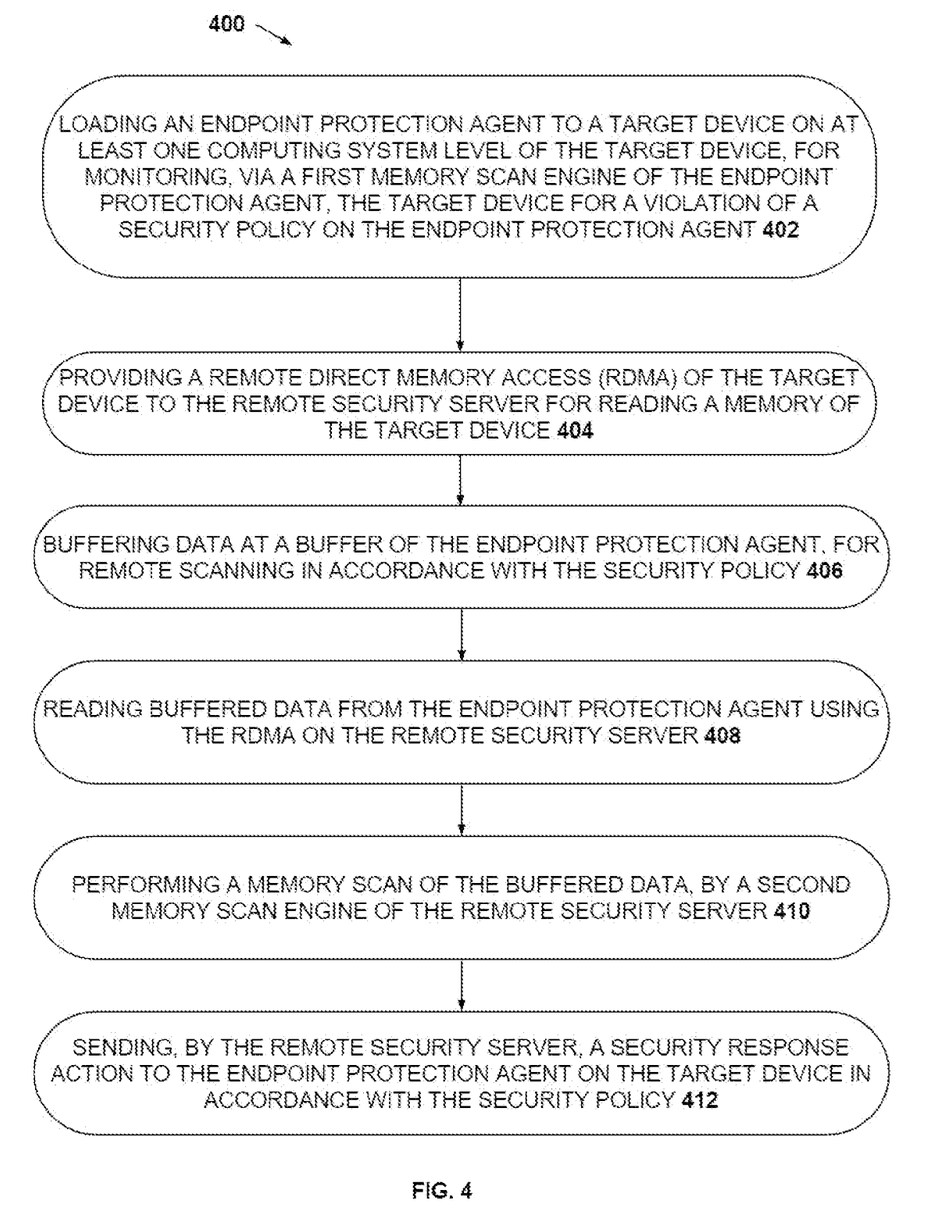
FIG. 4 illustrates another method diagram for performing a non-invasive scan of a target device, according to the embodiment of the present disclosure.

An alternative embodiment of a method 400 for performing a non-invasive malware scan of a target device 102, is depicted in FIG. 4. The order in which the method 400 is described is not intended to be construed as a limitation, and any number of the described method blocks can be combined in any order to implement the method or any alternative methods. Additionally, individual blocks may be deleted from the method without departing from the spirit and scope of the subject matter described herein. Furthermore, the method can be implemented in any suitable hardware, software, firmware, or combination thereof.

At block 402, the method 400 comprises loading an endpoint protection agent 110 to a target device 102 on at least one computing system level of the target device. In accordance with a non-limiting exemplary embodiment of the present subject matter, the at least one computing system level includes application level and kernel level. The loading of the endpoint protection agent 110 on the target device 102 is performed for monitoring, via a first memory scan engine 202 of the endpoint protection agent 110, the target device 102 for a violation of a security policy on the endpoint protection agent 110.

At block 404, the method 400 comprises providing a Remote Direct Memory Access (RDMA) of the target device 102 to the remote security server 104 for reading a memory of the target device 102. In one embodiment, the target device 102 includes a first RDMA unit 108A, and the remote security server 104 includes a second RDMA unit 108B for facilitating provision of remote direct memory access of the target device 102 to the remote security server 104 to perform the non-invasive malware scan of the target device 102.

At block 406, the method 400 comprises buffering data at a buffer 218 of the endpoint protection agent 110, for remote scanning in accordance with the security policy. More specifically, the buffered data may be transmitted over to the remote security server 104 for further scanning if it is detected by the endpoint protection agent 110 that a violation of the security policy has taken place.

At block 408, the method 400 comprises reading the buffered data from the endpoint protection agent 110 using the RDMA on the remote security server 104. At block 410, the method 400 comprises performing a memory scan of the buffered data, by a second memory scan engine of the remote security server. More specifically, the step of performing the memory scan may also include identifying the threat that is infecting the target device 102.

Once the threat has been identified, the method 400 at block 410 includes sending, by the remote security server 104, a security response action to the endpoint protection agent 110 on the target device 102 in accordance with the security policy.

The advantageous aspect of the system and method, in accordance with one or embodiments of the present subject matter, is that the use of the RDMA protocol allows the remote security server 104 to scan the memory 204 of the target device 102. Such a scan is more effective than other types of malware scans which include scanning of the disk or the network.

Another advantageous aspect of the system and method, in accordance with one or more embodiments of the present subject matter, is that the computing resources of the target device 102 are more optimally utilised because the scanning of the memory 204 of the target device 102 is being performed by the remote security server 104 using the RDMA protocol. This means that the computing resources of the target device 102 that would otherwise have been used to perform the malware scan on the target device 102 are now free for use by the target device 102 to perform other tasks. Such a feature directly impacts and improves the processing power and processing speed of the target device 102.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for performing a non-invasive malware scan of a target computing device including a processor and a memory, by way of scanning only the memory of the target computing device, the method comprising:

loading a Remote Direct Memory Access ("RDMA") unit and an endpoint protection agent comprising a first memory scan engine on the target computing device;

monitoring, via the first memory scan engine of the endpoint protection agent and the RDMA unit, the memory of the target computing device for a violation of a predetermined security policy on the endpoint protection agent;

providing, by the RDMA unit, remote direct memory access to the memory of the target computing device to a remote security server for reading the memory of the target computing device;

scanning, by a second memory scan engine of the remote security server, the memory of the target device upon violation of the predetermined security policy, wherein the scanning is only of processes occurring on the device during the scan and does not include scanning files or running a virus scanner on the target device;

identifying, by the second memory scan engine of the remote security server, a threat on the target device; and sending, by the remote security server, a security response action to the RDMA unit on the target device in accordance with the predetermined security policy.

2. The method according to claim 1, wherein the endpoint protection agent is isolated from other applications and processes on the target computing system.

3. The method according to claim 2, wherein the endpoint protection agent is isolated by way of a container, a virtual machine, or a module on a hypervisor.

4. The method according to claim 1, further comprising updating and defining rules and definitions of the security policy.

5. The method according to claim 1, wherein the security response action includes at least one of a process termination, block of a network connection, file deletion, and system restore.

6. The method according to claim 1, wherein the violation of security policy indicates at least one of a presence of a suspicious system activity, a presence of an untrusted process, an unsecure connection, and a suspicious user behaviour.

7. The method according to claim 1, wherein the remote security server is configured to scan only memory space related to the violation of the security policy.

8. A method for performing a non-invasive malware scan of a target computing device including a processor and a memory, by way of scanning only the memory of the target computing device, the method comprising:

loading a Remote Direct Memory Access ("RDMA") unit and an endpoint protection agent comprising a first memory scan engine on the target computing device monitoring, via the first memory scan engine of the RDMA unit, the target computing device for a violation of a predetermined security policy, providing remote direct memory access to the memory of the target device to the remote security server for reading the memory of the target device;

buffering data at a buffer of the RDMA unit, for remote scanning in accordance with the security policy;

reading buffered data from the RDMA unit using remote direct memory access on a remote security server;

performing a memory scan of the buffered data, by a second memory scan engine of the remote security server, wherein the scan is only of processes occurring on the device during the scan and does not include scanning files and wherein the memory scan does not include running a virus scanner on the target device; and sending, by the remote security server, a security response action to the RDMA unit on the target device in accordance with the predetermined security policy.

9. A system for performing a non-invasive malware scan on a target computing device including a processor and a memory, by way of Remote Direct Memory Access ("RDMA"), the system comprising:

an RDMA unit configured for operation on the target device, the RDMA unit comprising:
  a first memory scan engine configured for monitoring the memory of the target computing device for violation of a security policy;
  a communication unit coupled to the first memory scan engine; and
  a first task manager configured for performing a security response action on the target computing device in accordance with the security policy; and a remote security server communicatively coupled to the RDMA unit, the remote security server comprising:
a threat database; and
a second memory scan engine configured for:
  scanning a memory of the target device upon the violation of the security policy;
  identifying a threat; and
  recommending the security response action to the first task manager in accordance with the security policy; and wherein the remote security server includes a remote direct memory access unit for facilitating provision of remote direct memory access of the target computing device to the remote security server to perform the non-invasive malware scan of the target device, and wherein the second memory scan engine is configured to scan only processes occurring on the device during the scan and does not include scanning files and wherein the endpoint protection agent does not include a virus scanner running on the target device.

10. The system according to claim 9, wherein the remote security server further comprises:

a second task manager configured for scheduling system associated operations and scan queues; and a security policy manager configured to update and define rules and definitions of the security policy.

11. The system according to claim 9, wherein the security response action includes at least one of a process termination, block of network connection, file deletion, and system restore.

12. The system according to claim 9, wherein the violation of security policy indicates at least one of a presence of a suspicious system activity, a presence of an untrusted process, an unsecure connection, and a suspicious user behaviour.

13. The system according to claim 9, wherein the remote security server is configured to scan only memory space related to the violation of the security policy.

14. The system according to claim 9, wherein the endpoint protection agent further comprises a buffer for buffering data of the target device.

15. The system according to claim 14, wherein the remote security server is configured to scan buffered data.

* * * * *